(12) United States Patent
Shillington

(10) Patent No.: US 7,380,761 B2
(45) Date of Patent: Jun. 3, 2008

(54) MOUNTING AND ALIGNMENT BRACKET ASSEMBLY FOR COMMUNICATION EQUIPMENT

(75) Inventor: Andrew E. Shillington, Mt. Prospect, IL (US)

(73) Assignee: Motorola, Inc., Schaumburg, IL (US)

( * ) Notice: Subject to any disclaimer, the term of this patent is extended or adjusted under 35 U.S.C. 154(b) by 83 days.

(21) Appl. No.: 11/536,073

(22) Filed: Sep. 28, 2006

(65) Prior Publication Data

US 2008/0078905 A1    Apr. 3, 2008

(51) Int. Cl.
*E04G 3/00*    (2006.01)
(52) U.S. Cl. ................. 248/292.12; 248/222.51; 248/220.24; 248/906
(58) Field of Classification Search ........ 248/917–923, 248/906, 292.12, 222.51, 220.21, 285.1, 248/286.1, 222.52
See application file for complete search history.

(56) References Cited

U.S. PATENT DOCUMENTS

| | | | | |
|---|---|---|---|---|
| 4,647,108 A | * | 3/1987 | Hayashi | ............... 297/391 |
| 6,085,953 A | * | 7/2000 | Bober et al. | ............... 224/282 |
| 7,152,836 B2 | * | 12/2006 | Pfister et al. | .......... 248/292.14 |
| 7,178,775 B2 | * | 2/2007 | Pfister et al. | .......... 248/292.14 |
| 2006/0087476 A1 | | 4/2006 | Piburn et al. | |
| 2006/0291152 A1 | * | 12/2006 | Bremmon | ................... 361/681 |
| 2007/0170336 A1 | * | 7/2007 | Li | ......................... 248/292.14 |

* cited by examiner

*Primary Examiner*—Amy J. Sterling

(57) ABSTRACT

A bracket is provided for mounting and aligning communication equipment. The bracket includes at least one pivot joint mechanically coupled between the communication equipment and a mounting structure. At least one curved arm is connected to the communication equipment. The arm describes an arc of a circle having any point along a length of the arc substantially equidistant from the pivot joint. A plane of the arc is substantially perpendicular to a rotational axis of the pivot joint. A clamp is connected to the mounting structure, and is configured to clamp the arm along a length thereof. A locking mechanism locks the clamp to the arm to prevent rotation of the communication equipment.

16 Claims, 4 Drawing Sheets

MOUNTING AND ALIGNMENT BRACKET ASSEMBLY FOR COMMUNICATION EQUIPMENT

FIELD OF THE INVENTION

The present invention relates in general to mounting structures and more specifically to mounting structures for communication equipment.

BACKGROUND OF THE INVENTION

Today's wireless broadband communication networks relay on geographically-spaced communication equipment, such as access point transceivers or antennas that communicate with local access terminals that may be mobile or fixed. The communication equipment is typically located on rigid mounting structures, and serves a particular geographic area. This requires that the communication equipment be mounted on the mounting structure and aligned such that the communication equipment properly services any access terminal within it designated geographic area.

Mounting telecommunication equipment on a mounting structure, such as a cell tower, is typically performed by a technician climbing the structure and working while being held from a cable or rope. Mounting and alignment is performed by attaching various structural members together with loose fasteners (e.g. screws, bolts, nuts, washers), and with hand tools, to provide a fixed assembly that holds the communication equipment in a particular orientation. This is expensive, time consuming, dangerous, prone to alignment errors, and prone to damage from mishandled or dropped equipment due to the precarious installation environment.

Therefore, it would be of benefit to provide a much simpler apparatus that reduces the effort needed to mount and align communication equipment to a mounting structure. It would also be of benefit to provide a safer installation procedure while reducing or eliminating the need for tools to align the equipment. It would also be of benefit to simplify installation in inclement weather, such as when the weather is cold and the installer is wearing heavy clothing/gloves, wherein alignment can be accomplished quickly, easily, and accurately without much discomfort on the part of the installer.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

Skilled artisans will appreciate that common but well-understood elements that are useful or necessary in a commercially feasible embodiment are typically not depicted or described in order to facilitate a less obstructed view of these various embodiments of the present invention.

DETAILED DESCRIPTION OF THE EMBODIMENTS

The present invention provides an apparatus for mounting and aligning communication equipment to a mounting structure. The present invention provides a safer installation procedure while reducing or eliminating the need for tools to align the equipment. In addition, the apparatus simplifies installation in inclement weather, such as when the weather is cold and an installer is wearing heavy clothing/gloves, wherein alignment can be accomplished quickly, easily, and accurately without much discomfort on the part of the installer.

Moreover, the present invention results in lower installation cost due to the time savings involved. The installer can assemble all of the equipment on the ground, where the equipment can be easily adjusted to the proper orientation, then locked in place by hand without tools. Further, since no tools are required, the risk of dropping tools and equipment is reduced, which also reduces the risk of injury to people on the ground, and the time/cost to send tools and equipment back up to the installer.

Figure 1:
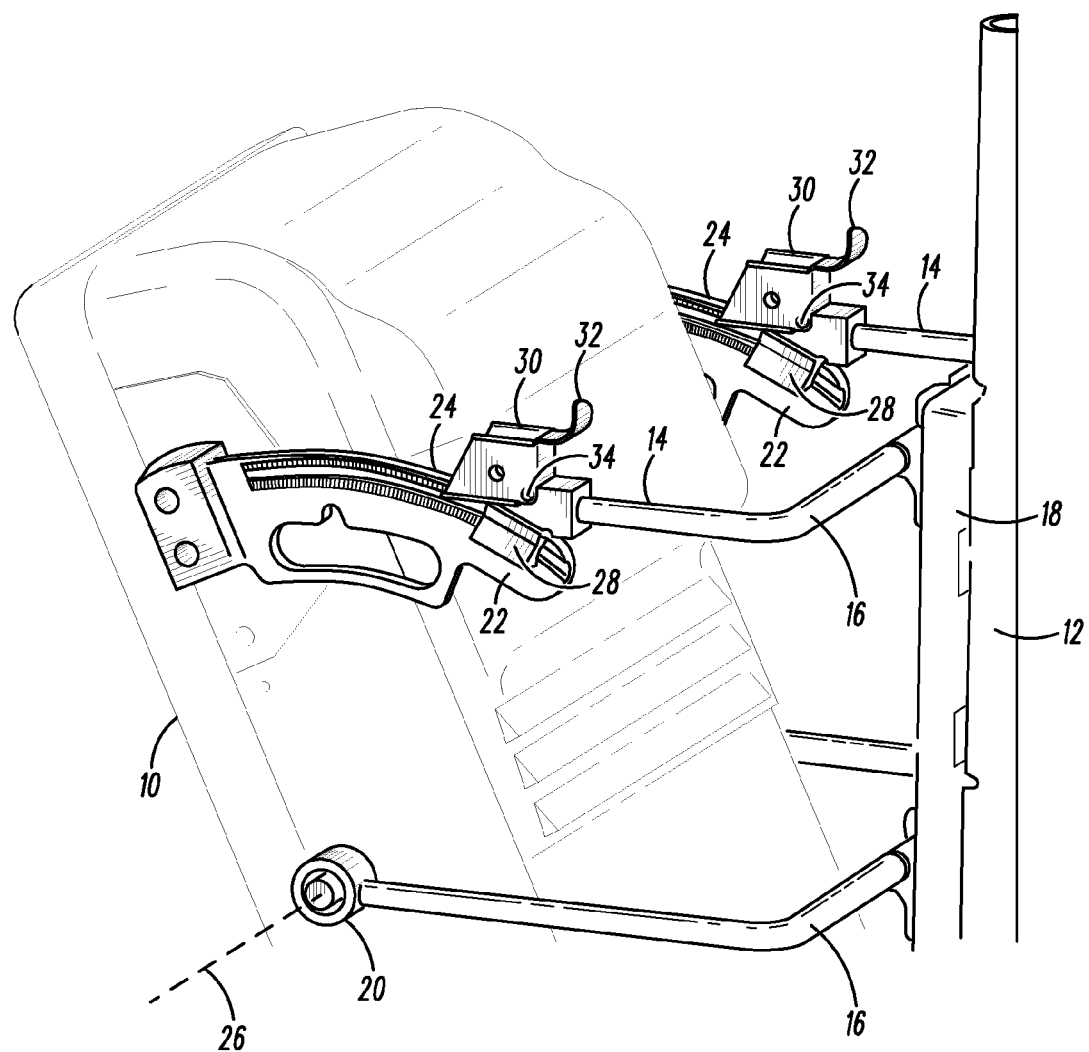
FIG. 1 is a perspective view of an apparatus, in accordance with the present invention.
Figure 2:
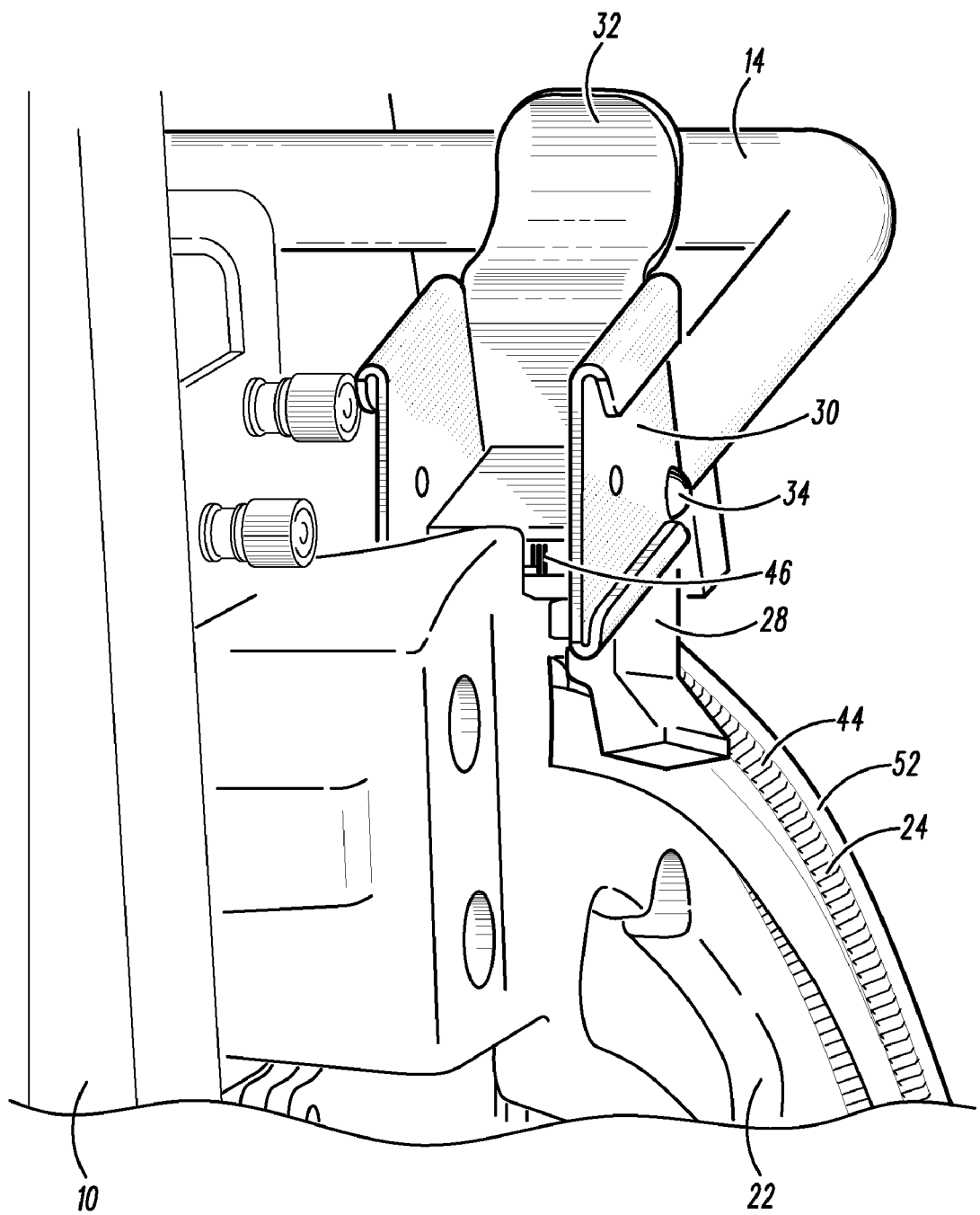
FIG. 2 is a close-up view of another perspective of the apparatus of FIG. 1.

Referring to FIGS. 1 and 2, the present invention describes a bracket structure for mounting and aligning communication equipment 10 to a mounting structure 12, such as a rigid pole. A top bracket 14 and a bottom bracket 16 are rigidly attached to a mounting adapter 18, which is itself rigidly attached to the mounting structure 12. It should be recognized that the brackets may be configured to mate to the mounting structure 12 directly, thereby eliminating the need for the mounting adapter. It should also be recognized that the top and bottom brackets can be incorporated into one bracket unit. It should further be recognized that the top and bottom bracket and mounting adapter can be incorporated into one bracket unit. Inasmuch as all these components are rigidly connected, many unitary combinations including the mounting structure are envisioned by the present invention. As used herein the top and bottom brackets are commonly referred to together as a "mounting bracket". Any known technique for rigidly mounting or affixing the bracket(s) to the mounting structure can be used.

The bottom bracket 16 is mechanically coupled to the communication equipment 10 by one or more pivot joints 20. In the example shown, two pivot joints are used sharing a common rotational axis 26. Preferably, the pivot joints support the communication equipment such that the rotational axis of the pivot joints roughly intersects a center-of-gravity of the communication equipment. In this way, the equipment is in balance and requires very little effort to move into alignment or to keep in alignment without holding or locking the equipment in place, thereby free up a hand of the installer for other actions.

One or more curved arms 22 are rigidly connected to the communication equipment 10. Each curved arm 22 describes an arc of a circle 24 that is substantially centered on, and substantially perpendicular to, a rotational axis 26 of the pivot joint(s) 20. Only one arm 22 is required, but two or more may be utilized as shown.

The top bracket 14 has one or more clamps 28 disposed thereon. There is one clamp 28 for each arm 22, with the arm located in proximity to, or within, its respective clamp. When the communication equipment is rotated about the rotational axis 26 of the pivot joints 20, the arc 24 of each arm 22 rotates within each clamp such that the relative positional relationship between the arm and clamp remains substantially constant. In this way, the clamp can be used to clamp the arm at any location along the length of the arc of the arm. Preferably, the arm and clamp have frictional or mechanically engaging mating surfaces.

A locking mechanism 30 is provided and configured to lock the clamps 28 in place on the arm 22, in order to prevent rotation of the communication equipment 10 with respect to the mounting structure. In a preferred embodiment, the locking mechanism is permanently attached to the top bracket 14, making it possible for the installer to lock the clamps in place without any tools. The locking mechanism can be configure to slide or clip into place (not shown) around the clamp to hold it. Optionally, the locking mechanism can pivot into place (as shown, unlocked) about a pivot pin 34 to rotate the locking mechanism around the clamp to hold it. It should be recognized that many different configuration of locking mechanism can be used equally well in the present invention with the proviso that the locking mechanism is permanently co-located with the bracket and is operable by an installer without tools. As shown, the locking mechanism incorporates a finger tab to facilitate easy operation by an installer by the application of mechanical pressure thereto, even through heavy gloves.

Figure 3:
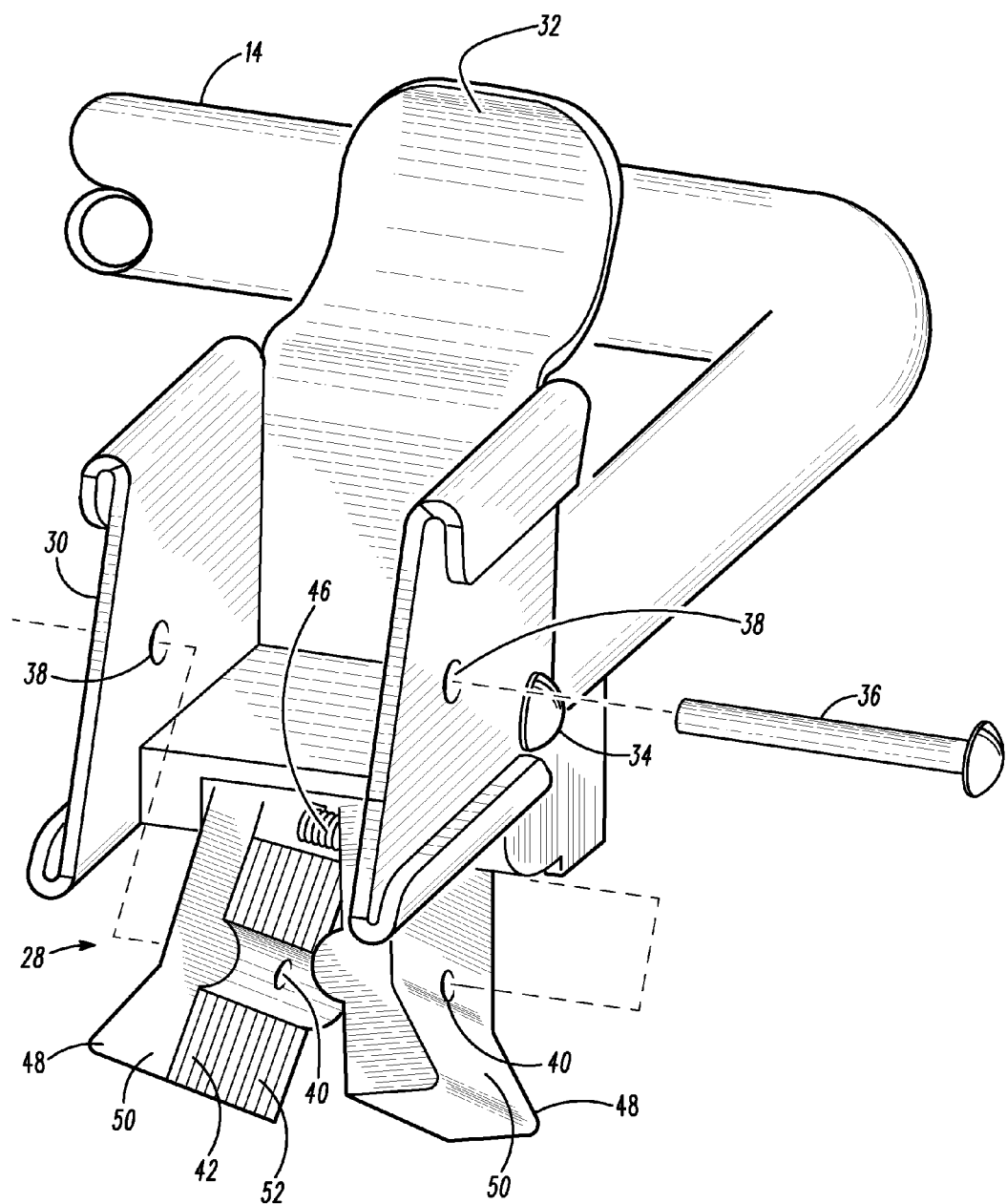
FIG. 3 is a close-up perspective view of the clamp and locking mechanism of the apparatus of FIG. 1.

Referring to FIGS. 2 and 3, the clamp comprises at least one mating pad 50 with a mating surface thereon 42. As shown in the example, two pads 50 are preferred, that are loaded by a spring 46 such that the pads spread apart from each other when the clamp is unlocked. Similarly, each arm 22 includes at least one mating surface 44. As assembled, the mating surfaces 42, 44 are located in proximity to each other, and are operable to contact each other upon application of the clamp. In one embodiment, one or both of the mating surfaces 42, 44 include a frictional material to facilitate firm clamping.

In a preferred embodiment, the arm 22 and clamp 28 have mating surfaces 44, 42 with complementary matching grooves 52 defined thereon, wherein the matching grooves 52 are operable to engage each other upon application of the clamp to prevent slippage. More preferably, each pad 50 of the clamp 28 includes a cam profile 48 thereon, wherein operation of the locking mechanism 30 engages the cam profile 48 on the mating pad 50 to drive the mating surface 42 of each pad 50 into contact with the corresponding mating surface 44 of the associated arm 42 preventing its movement with respect to the clamp 28. In practice, the matching grooves 52 are aligned radially from the rotational axis (26 of FIG. 1) of the at least one pivot joint (20 of FIG. 1). As configured, the arm and clamp pads can be made of a metal such as stainless steel.

In operation, the locking mechanism is configured to be unlocked (rotated up about the pivot pin 34) by hand using the finger tab 32 (even if wearing heavy gloves) without requiring tools. The spring loaded clamp will snap away from the arm when unlocked, and the communication equipment (e.g. antenna or access point) is free to rotate about 25 degrees down, or about 10 degrees up from the vertical position. When the equipment is rotated into the correct position, the locking mechanism is locked (rotated down about the pivot pin 34) back into position, forcing the grooves on the clamp to engage the grooves on the arm, thereby locking the equipment in place with respect to the mounting structure. The locking and unlocking action can be performed easily to allow adjustment of the communication equipment.

In a preferred embodiment, a pin 36 is provided for each locking mechanism. When the locking mechanism 30 is locked onto the clamp 28, a set of holes 38, 40 are aligned. The pin is inserted through each of the aligned holes of the closed locking mechanism 38 and clamp 40 to capture both the locking mechanism and clamp such that the locking mechanism 30 can not be moved in relation to the clamp 28, thereby keeping the clamped locked to the arm 22. The pin can be spring-loaded or provided with a detent mechanism, as is known in the art, to improve retention in the holes 38, 40. More preferably, the pin is tethered to the bracket or locking mechanism so that the installer need not supply any loose fastener or tool.

Figure 4:
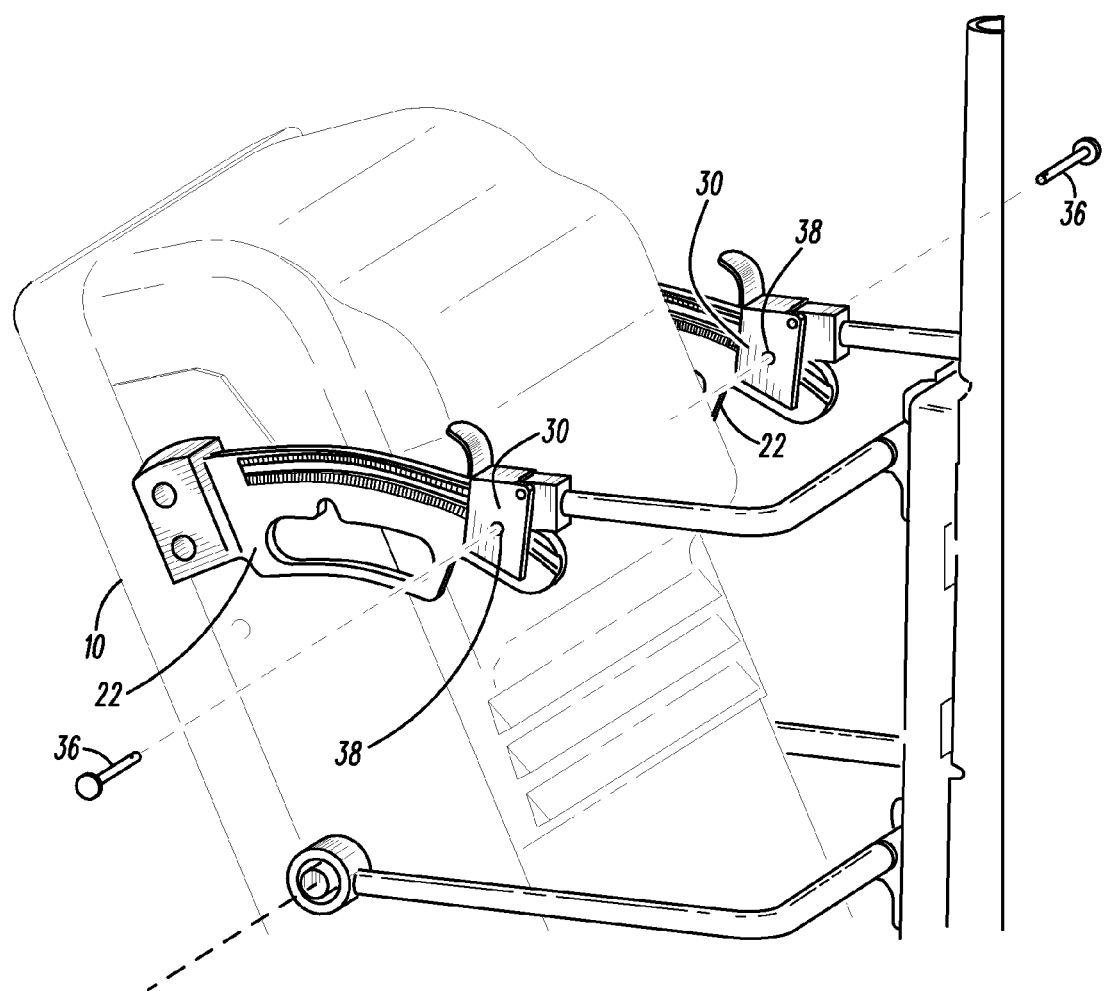
FIG. 4 is a perspective view of the apparatus of FIG. 1 in a locked position.

FIG. 4 demonstrates the locking mechanism 30 locking the clamps in a closed position on each arm 22. In this position, the holes 38 of the locking mechanism and the holes 40 (hidden) of the clamps are aligned and in position to accept the locking pin 36 by insertion therethrough.

As shown, the present invention provides one rotational degree of freedom. However, it should be recognized that further mounting bracket assemblies could be combined with similar features as described above, but about different rotational axes, to provide freedom of rotation about two or more degrees of freedom.

Advantageously, the present invention provides a safer installation procedure for communication equipment in hostile environments while reducing or eliminating the need for tools and fasteners to align the communication equipment. In addition, the present invention simplifies installation such that communication equipment can be mounted and aligned quickly, easily, and accurately with less cost.

The mechanisms depicted in the drawings are merely illustrative of one or more embodiments of the invention, and other implementations will be apparent to those of ordinary skill in the art. The drawings are intended to illustrate various implementations of the invention that can be understood and appropriately carried out by those of ordinary skill in the art. Any arrangement, which is calculated to achieve the same purpose, may be substituted for the specific embodiments shown.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means or elements may be implemented in the present invention. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

What is claimed is:

1. A mounting and alignment bracket assembly for communication equipment, the bracket comprising:

at least one pivot joint mechanically coupled between the communication equipment and a mounting bracket;

at least one curved arm connected to the communication equipment, the at least one curved arm describing an arc of a circle substantially centered on, and substantially perpendicular to, a rotational axis of the pivot joint; and a clamp connected to the mounting structure, the clamp configured to clamp the arm along a length thereof, wherein the arm and clamp have mating surfaces with matching grooves defined thereon, and wherein the matching grooves are operable to engage each other upon application of the clamp.

2. The bracket of claim 1, wherein the at least one pivot joint provides a rotational axis that intersects a center-of-gravity of the communication equipment.

3. The bracket of claim 1, including two pivot joints sharing a common rotational axis.

4. The bracket of claim 1, further comprising a locking mechanism to lock the clamp onto the arm to prevent rotation of the communication equipment.

5. The bracket of claim 4, wherein the locking mechanism is operable to lock the clamp by applying a mechanical pressure thereto.

6. The bracket of claim 4, further comprising a pin to capture both the locking mechanism and clamp such that the locking mechanism can not be moved in relation to the clamp.

7. The bracket of claim 1, wherein the arm and clamp have frictional mating surfaces.

8. The bracket of claim 1, wherein the matching grooves are aligned radially from the rotational axis of the at least one pivot joint.

9. A mounting and alignment bracket assembly for communication equipment, the bracket comprising:

two pivot joints mechanically coupled between the communication equipment and a mounting bracket, the two pivot joints operable to pivot around a common rotational axis that intersects a center-of-gravity of the communication equipment;

two curved arms connected to the communication equipment, each curved arm describing an arc of a circle substantially centered on, and substantially perpendicular to, a rotational axis of the pivot joints;

two clamps connected to the mounting bracket, each clamp configured to clamp one of the arms along a length thereof, wherein each arm and clamp have mating surfaces with matching grooves defined thereon, and wherein the matching grooves are operable to engage each other upon application of the respective clamp; and a locking mechanism operable to lock each clamp to its associated arm to prevent rotation of the communication equipment.

10. The bracket of claim 9, further comprising a pin to capture both the locking mechanism and clamp such that the locking mechanism can not be moved in relation to the clamp.

11. The bracket of claim 9, wherein the arm and clamp have frictional mating surfaces.

12. The bracket of claim 9, wherein each clamp includes at least one spring-loaded mating ear with a cam profile thereon, and wherein operating the locking mechanism engages the cam profile on the mating ear to drive and hold the mating ear into contact with a mating surface of the associated arm preventing its movement with respect to the clamp.

13. The bracket of claim 9, wherein the matching grooves are aligned radially from the rotational axis of the pivot joints.

14. A mounting and alignment bracket assembly for communication equipment, the bracket comprising:

two pivot joints mechanically coupled between the communication equipment and a mounting structure, the two pivot joints operable to pivot around a common rotational axis that intersects a center-of-gravity of the communication equipment;

two curved arms connected to the communication equipment, each curved arm describing an arc of a circle substantially centered on, and substantially perpendicular to, a rotational axis of the pivot joints, each arm having a mating surface with grooves defined thereon;

two clamps connected to the mounting structure, each clamp configured with two opposing spring-loaded mating pads having inner mating surfaces with grooves defined thereon to engage the grooves of the associated arm and with outer surfaces with cam profiles defined thereon, the pads of each clamp to clamp one of the arms along a length thereof; and two locking mechanisms, each operable to engage the cam profiles on the mating pads of each associated clamp to drive and hold the mating pads into contact with a mating surface of the associated arm to prevent rotation of the communication equipment.

15. The bracket of claim 14, further comprising a spring loaded pin to capture each locking mechanism with its associated clamp such that the locking mechanism can not be moved in relation to the clamp.

16. The bracket of claim 14, wherein the grooves of the pads and arm are aligned radially from the rotational axis of the pivot joints.

\* \* \* \* \*